United States Patent [19]

Ikeda et al.

[11] Patent Number: 4,631,555

[45] Date of Patent: Dec. 23, 1986

[54] LIQUID JET TYPE RECORDING HEAD

[75] Inventors: Masami Ikeda, Machida; Makoto Shibata, Hiratsuka; Hiroto Matsuda, Ebina; Hiroto Takahashi, Hiratsuka, all of Japan

[73] Assignee: Canon Kabushiki Kaisha, Tokyo, Japan

[21] Appl. No.: 596,908

[22] Filed: Apr. 5, 1984

[30] Foreign Application Priority Data

Apr. 19, 1983 [JP] Japan .................................. 58-67723

[51] Int. Cl.[4] .............................................. G01D 15/18

[52] U.S. Cl. .................................................. 346/140 R

[58] Field of Search ..................................... 346/140 R

[56] References Cited

U.S. PATENT DOCUMENTS 4,353,079 10/1982 Kawanabe ....................... 346/140 R
4,380,771 4/1983 Takatori ........................... 346/140 R
4,438,191 3/1984 Cloutier ........................... 346/140 R
4,463,359 7/1984 Ayata .............................. 346/140 R
4,490,728 12/1984 Vaught ........................... 346/140 R

*Primary Examiner*—Joseph W. Hartary
*Attorney, Agent, or Firm*—Fitzpatrick, Cella, Harper & Scinto

[57] ABSTRACT

A liquid jet type recording head comprises a liquid discharge section including an orifice for discharging the liquid to form flying droplets and a liquid passage providing part of a heat acting portion at which thermal energy acts on the liquid to form droplets, at least a pair of opposed electrodes electrically connected with a heat generating resistive layer on a substrate, and an electro-thermal converting element having a heat generating portion located between the electrodes, in which at least one of the electrodes is a turned electrode in which at least a portion thereof adjacent to said heat generating portion has a width smaller than that of said heat generating portion.

1 Claim, 9 Drawing Figures

LIQUID JET TYPE RECORDING HEAD

BACKGROUND OF THE INVENTION

1. Field of the Invention

The present invention relates to a liquid jet type recording head for effecting a recording by jetting liquid to form flying droplets.

2. Description of the Prior Art

Great interest has been shown in the ink jet type recording process (liquid jet type recording process) because of its many advantages; for example very little, negligible noise is produced during recording, recording can be carried out at higher speeds and the process does not require any special procedure for fixing the record to so-called ordinary paper.

One of these liquid jet type recording processes is described in Japanese Laid-open Patent Application No. 51837/1979 and German Laid-open Gazette (DOLS) No. 2843064. This process can be distinguished from other liquid jet type recording processes in that thermal energy is caused to act on liquid for providing motive power to discharge liquid drops.

The above described recording process is characterized in that when it is influenced by the thermal energy, the liquid is abruptly increased in volume and then discharged from orifices on the tip of a recording head to form flying drops due to the increased volume of the liquid, these flying drops being adhered to a recording member.

The liquid jet type recording process disclosed in the above DOLS No. 2843064 has a particular advantage in that it can provide images with high quality and resolution at high speed because it can very effectively be applied to the so-called Drop-On Demand recording process and is easily embodied in a full line type high-density multi-orifice recording head.

A recording head portion of a recording system to which the above process is applied comprises a liquid discharge section including orifices for discharging the liquid and liquid passages, each communicating with a corresponding orifice and having a portion in which thermal energy acts on the liquid to discharge liquid drops, and an electro-thermal converting member for generating the thermal energy.

The electro-thermal converting member comprises a pair of electrodes and a heat generating resistive layer having a heat generating region between these electrodes. In general, the electrodes and heat generating resistive layer are covered by a protective layer and located on an insulating base plate. A typical structure of such a recording head is shown in fragmentary section in FIG. 1.

As shown in FIG. 2, an electro-thermal converting member 101 is of a laminated structure which comprises a substrate 102 made of silicon, glass, ceramic or the like, a lower layer 103 on the substrate 102 and made of $SiO_2$ or the like, a heat generating resistive layer 104 on the lower layer 103 for generating a thermal energy and which is made of Al or the like, an electrode layer 105 located on the heat generating resistive layer 104 for supplying current flows in accordance with information and which is made of $SiO_2$ or the like, a first upper layer 106 for protecting the heat generating resistive layer 104 and the electrode layer 105, a second upper layer 107 assisting the first upper layer 106 and being made of polyimide or the like, and a third upper layer 108 of Ta or the like for increasing the mechanical strength of the structure. Although the illustrated structure has three upper layers, it is not limited to this, but may be constituted of one or two upper layers or four or more upper layers to protect the layers other than these upper layers. If the materials of the heat generating resistive layer 104 and electrode layer 105 are sufficient for ink-resistance and mechanical strength, the upper layers are not necessarily required.

As viewed from above with the upper layers being removed, the electro-thermal energy converting member has a plane profile shown in FIG. 1 which comprises a plurality of parallel-arranged converting units on the lower layer 201, each of the converting units including a heat generating portion 202, a turned electrode 203 connected with the heat generating portion 202 at one end, and a straight electrode 204 connected with the other end of the heat generating portion 202.

The heat generating portion 202 and the electrodes 203, 204 are generally formed in accordance with the following process. The lower layer 103 is first formed on the substrate 102. The heat generating resistive layer 104 of $HfB_2$ or the like is then formed on the lower layer 103 by the use of any suitable means such as vapor deposition, sputtering or the like. The electrode layer 105 of Al or the like is further formed on the heat generating resistive layer 104 in a similar manner. Subsequently, the electrode layer 105 and the thermal resistance layer 104 are partially removed with the so-called photo-etching process utilizing a photo-mask which has such a pattern as shown in FIG. 3. Finally, by the similar photo-etching process utilizing a photo-mask of such a pattern as shown in FIG. 4, the electrode layer 105 is further partially removed to form the desired electrode and heat generating portions at the desired positions.

The role of the heat generating portion 202 is to convert electrical energy into thermal energy so that the resulting heat will cause the liquid within the liquid passage to evaporate through the upper layers 106 and 108. The evaporation of the liquid varies its own volume to provide energy for discharging the recording liquid from the liquid jet type recording head. Therefore, the heat generating portion 202 cannot be reduced in size. In order to improve printed letters in quality, the shade of picture elements may be provided by changing the size of liquid droplets. As the size of the heat generating portion is increased, the range throughout which the size of liquid droplets can be changed is correspondingly widened.

On the other hand, it is also important to improve the quality of recorded images by increasing the recording density to raise the resolving power. For such a purpose, the recording head should be of a high-density full multiple head. However, the conventional recording heads have the heat generating portion of the same width $W_1$ as the width $W_2$ of the turned electrode so that the recording head cannot compactly be formed with higher density and without decreasing the size of the heat generating portion.

SUMMARY OF THE INVENTION

It is therefore a object of the present invention to provide a liquid jet type recording head having high-density multiple orifices for obtaining high-quality recorded image.

Another object of the present invention is to provide a liquid jet type recording head including multiple orifices arranged with high density while assuring the size of the heat generating portion.

Still another object of the present invention is to provide a liquid jet type recording head which comprises a liquid discharge section having an orifice for discharging the liquid to form flying drops and a liquid passage including a heat acting portion at which a thermal energy acts on the liquid to form the liquid drops, at least a pair of opposed electrodes electrically connected with a thermal resistance layer on a substrate, and an electro-thermal energy converting member having its heat generating portion located between said electrodes, at least one of said electrodes being turned, said recording head being characterized in that at least a portion of said turned electrode adjacent to said heat generating portion has its width smaller than that of said heat generating portion.

DETAILED DESCRIPTION OF PREFERRED EMBODIMENTS

Figure 5:
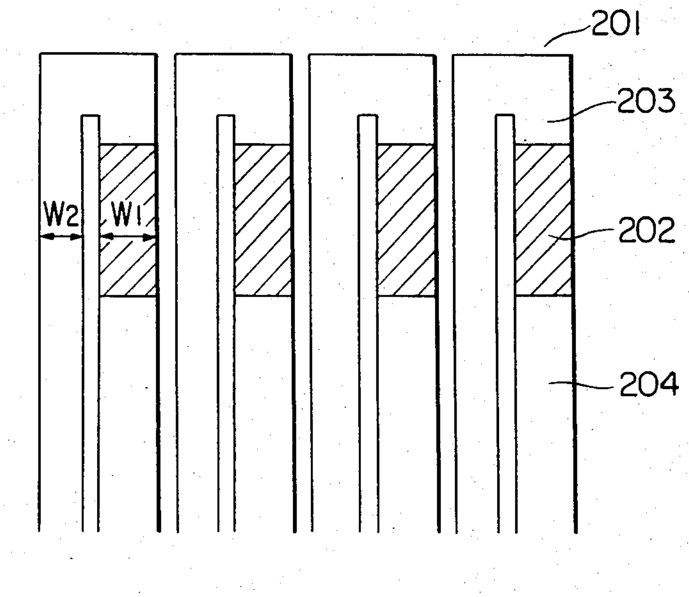
FIGS. 5 through 7 are plan views showing different electro-thermal energy converting units at a position to the heat generating portion, which are embodied in accordance with the principle of the present invention.

The present invention will now be described in more detail with reference to FIGS. 5 through 7. Referring first to FIG. 5, each of the electro-thermal converting units includes a lower layer 201, a heat generating portion 202 and electrodes 203 and 204. In the embodiment shown in FIG. 5, one of the electrodes (turned electrode) 203 has its width W2 smaller than the width $W_1$ of the heat generating portion 202. Thus, the electro-thermal energy converting member according to the present invention can compactly be formed by a size corresponding to $(W_1-W_2)$ per pitch in comparison with the prior art electro-thermal converting members. However, the width of the turned electrode must be so determined that there will be produced no damage at that electrode and that the turned electrode will keep its durability against repeated applications.

In the prior art, the heat generating portion has its width $W_1$ in the range of 20μ to 30μ in which the recording head can compactly be formed only in the order to 8 pel to 12 pel. In the above embodiment of the present invention, the width $W_2$ of the turned electrode can be in the range of 5μ to 10μ so that the recording head will compactly be formed in the order of 16 pel to 32 pel.

Figure 6:
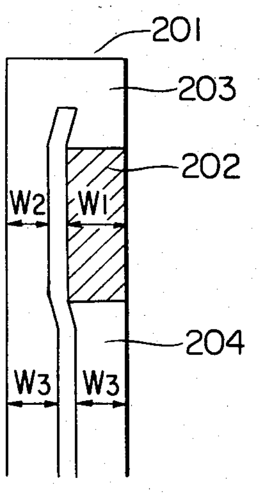
Figure 7:
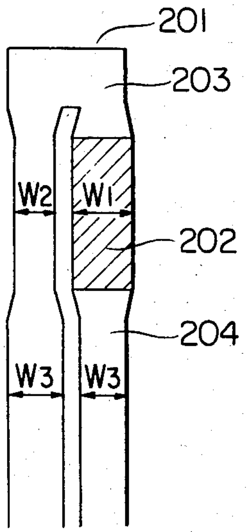

Referring now to FIGS. 6 and 7 which illustrate other embodiments of the present invention, these embodiments have turned electrodes which are not uniform in width. The heat generating portion of each of the embodiments is increased in width while the portion of the respective turned electrode 203 adjacent to the widened heat generating portion is correspondingly decreased in width. The remaining portion of the turned electrode 203 may have its width equal to that of the other electrode 204 as shown by $W_3$ in FIGS. 6 and 7. Alternatively, either of the electrodes may be reduced in width so far as its durability will be kept. The relationship between the heat generating portion 202 and the electrodes 203, 204 can be represented by $W_1 \geqq W_3 > W_2$ where both the electrodes have the same width $W_3$.

In the embodiment of FIG. 6, the heat generating portion 202 is extended at its inner side edge while the inner side edge of the turned electrode 203 adjacent to that heat generating portion 202 is correspondingly reduced in width. In the embodiment of FIG. 7, the heat generating portion 202 is widened at the opposite side edges while the portion of the turned electrode adjacent to the heat generating portion is correspondingly reduced in width at the opposite side edges. Both the embodiments shown in FIGS. 6 and 7 provide similar advantages to that of the embodiment shown in FIG. 5 since their durabilities can be kept against repeated applications.

Figure 1:
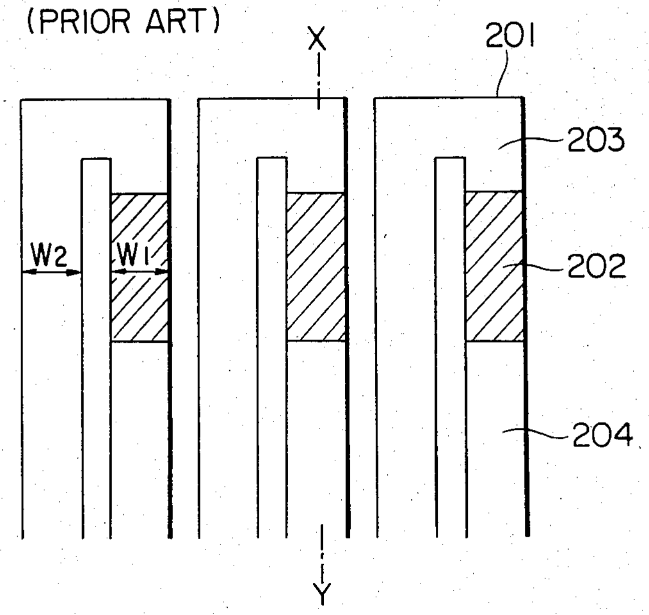
FIG. 1 (PRIOR ART)
FIG. 1 is a plan view of the base plate in the prior art liquid jet type recording head.
Figure 2:
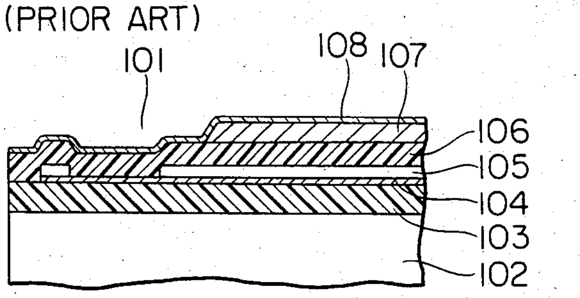
FIG. 2 (PRIOR ART)
FIG. 2 is a cross-sectional view taken along a line X-Y in FIG. 1.
Figure 3:
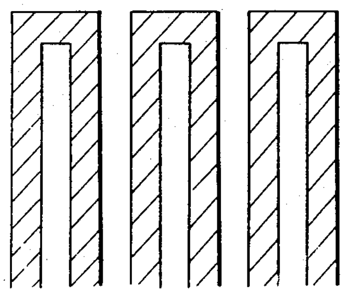
FIG. 3 (PRIOR ART)
FIGS. 3 and 4 are plan views showing different photo-masks respectively used for forming the electrodes and heat generating portion.
Figure 4:
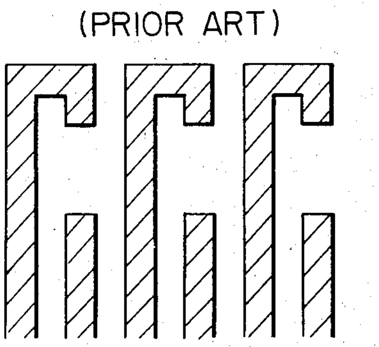
FIG. 4 (PRIOR ART)

In accordance with the present invention, the liquid jet type recording head includes an electro-thermal energy converting member having the above mentioned features which is formed on the substrate and covered by one or more upper layers as described in connection with FIG. 1. Subsequently, the electro-thermal energy converting member is completed by forming a liquid passage 205 and orifice 206 corresponding to the heat generating portion 109 of each of the electro-thermal converting units 101 on the substrate.

Figure 8:
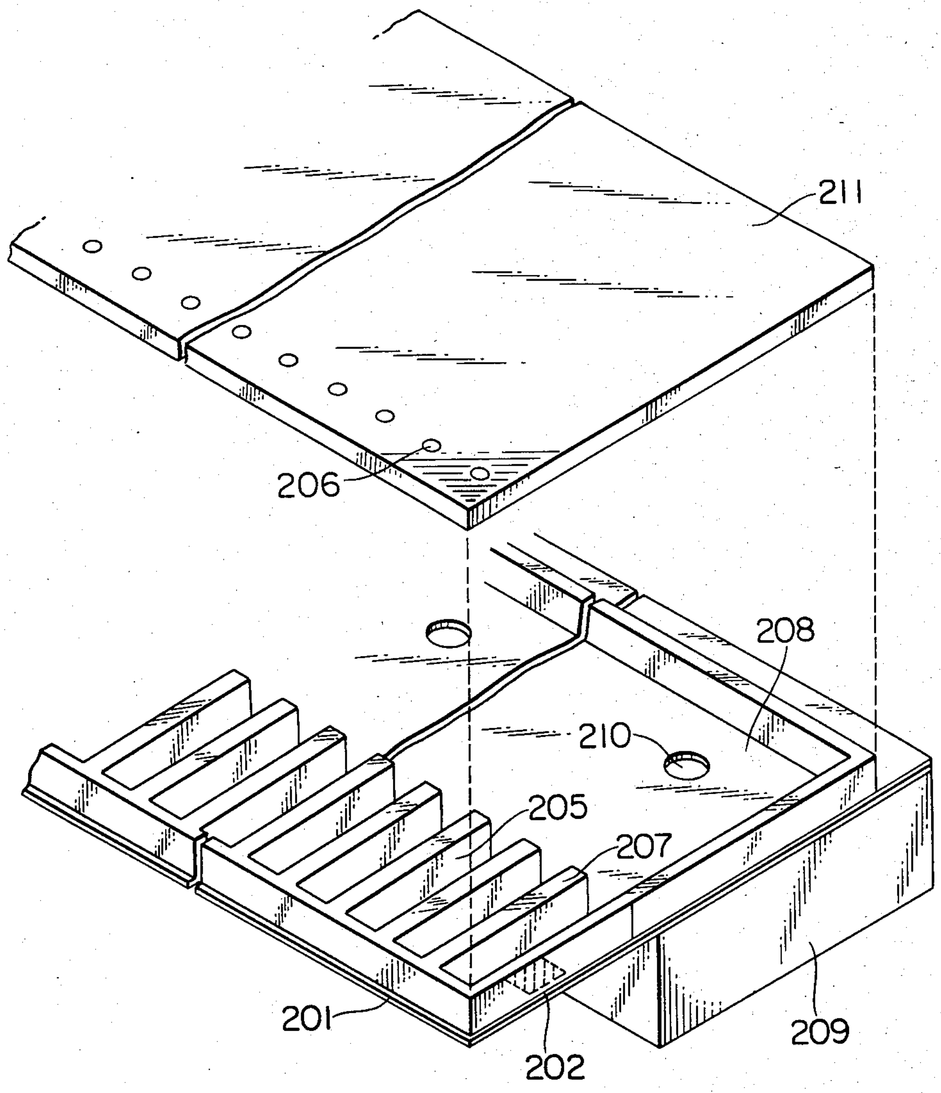
FIGS. 8 and 9 are diagrammatic views showing the constructions of liquid jet type recording heads in accordance with the principle of the present invention.

FIG. 8 shows the internal details of one of the liquid jet type recording heads constructed according to the present invention as described hereinbefore. This recording head includes an orifice 206 above each of the heat generating portions 202. The recording head further includes walls 207 defining the respective ink passages, a first common liquid chamber 208, a second common liquid chamber 209, a through aperture 210 connecting the common liquid chambers 208, 209 with each other, and a top plate 211. In FIG. 8, the wiring for the electro-thermal converting units is omitted for simplification.

Figure 9:
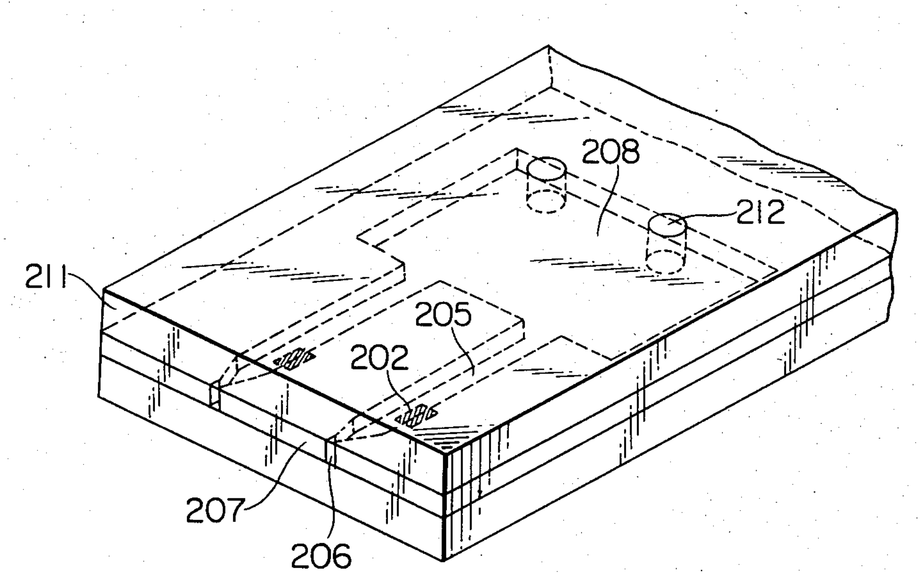

FIG. 9 shows the other form of the liquid jet type recording heads according to the present invention, in which each liquid passage tapers to an orifice 206 formed at the tip of each liquid passage. The ink is supplied to the recording head through openings 212.

An example of the liquid jet type recording heads according to the present invention will concretely be described.

EXAMPLE

A liquid jet type recording head in which such electro-thermal energy converting units as shown in FIG. 5 are compactly disposed with a high density included a substrate which was provided by forming a film of $SiO_2$ into a thickness of 5μ on a wafer of Si under thermal oxidation. On such a substrate there was formed a thermal resistance layer of $HfB_2$ into a thickness of 3000 Å under sputtering. Subsequently, layers of Ti and Al were continuously deposited on the thermal resistance layer into the respective thicknesses of 50 Å and 1000 Å by the use of electron beam vapor deposition.

A pattern having a repetition density of 16 units/mm was formed by photolithography such that the heat generating portion had its width $W_1$ of 30 μm and the turned electrode had its width $W_2$ of 10 $\mu m$. Subsequently, the electrode layer on the heat generating portion was etched to form such an electro-thermal energy converting unit as shown in FIG. 5.

Thereafter, a sputter layer of $SiO_2$ was deposited on the electro-thermal converting units into a thickness of 2.8 $\mu m$ under a high-rate sputtering. Any suitable protection layer was formed on the sputter layer by applying PIQ (trade mark) available from Hitachi Kasei using a spinner. The protective layer was removed at the heat generating portion by PIQ etchant and baked for solidification. Another sputter layer of Ta was further deposited on the protective layer into a thickness of 0.5 $\mu m$ to complete a single electro-thermal energy converting member including a plurality of electro-thermal converting units which were compactly arranged thereon.

Subsequently, such an electro-thermal converting member was covered by a dry film of photosensitive resin having a thickness of 50 $\mu m$. This assembly was then subjected to exposure and development through the desired pattern and provided with liquid passages and liquid supply chambers. Finally, a top plate of glass was adhered to close the liquid passages and supply chambers by the use of epoxy adhesive. As a result, such a liquid jet type recording head as shown in FIG. 9 was obtained.

In accordance with the present invention, the liquid jet type recording head can attain a recording density substantially two times those of the prior art and very significantly improve the quality of images.

What we claim is:

1. A liquid jet type recording head comprising a plurality of liquid discharge sections, each including an orifice for discharging liquid to form flying droplets and a liquid passage having therein a heat acting portion at which thermal energy acts on the liquid to provide the droplets, a plurality of electrodes, each being associated with one of each said liquid discharge sections and comprising opposed portions, and a plurality of electro-thermal converting elements, each having a heat generating portion located between said opposed portions of an associated one of said electrodes, wherein:

each of said electrodes has a turned portion with a part adjacent to and beside said associated heat generating portion and other parts adjacent to and beside said opposed portions of said electrode, the part of said turned portion adjacent to said associated heat generating portion has a width smaller than the width of said heat generating portion and the width across said turned portion and said opposed portions of each said electrode is substantially the same as the width across said turned portion and said associated heat generating portion, and said heat generating portions are spaced from each other at locations providing a compactly formed recording head.

* * * * *